United States Patent Office 3,533,520
Patented Oct. 13, 1970

3,533,520
BIN FOR HANDLING PARTICULATE MATERIALS
William Felix Hughes, 12–14 Wynyard St.,
Belmont, Western Australia, Australia
Filed Jan. 15, 1968, Ser. No. 697,661
Claims priority, application Australia, Jan. 16, 1967,
16,455/67
Int. Cl. B65g 1/00, 37/00; B67d 5/22
U.S. Cl. 214—16     9 Claims

ABSTRACT OF THE DISCLOSURE

A bin for handling particulate material and arranged to be mounted on the chassis of a motor vehicle, the bin being divided into two side by side compartments by a partition, each of the compartments having a channel at the bottom thereof, each channel being provided with a conveyor which feeds towards the partition onto conveying means located below the partition, which conveying means feed to one side of the bin.

---

This invention relates to a bin for handling particulate materials such as grain and superphosphate.

In its broadest form the invention resides in a bin for handling particulate material, said bin being substantially rectangular when viewed in plan, and adapted to be mounted on the chassis of a motor vehicle or the like, said bin being divided into two separate compartments by means of a substantially transverse partition, the lower portion of each of the side walls of each of the compartments sloping inwardly to form a central longitudinal channel at the bottom of each compartment said channels each being dimensioned to accommodate one of a pair of horizontally mounted longitudinal conveyors feeding from the end walls of the compartment towards the partition, the longitudinal conveyors each being adapted to feed through an opening in the partition to each co-operate with one of a pair of horizontally mounted transverse conveying means located below the partition and which conveying means are adapted to feed from a point adjacent the opening in the partition to one side of the bin.

The invention may be better understood by reference to the following description of a preferred embodiment of the invention as illustrated in the accompanying drawings in which.

Figure 1:
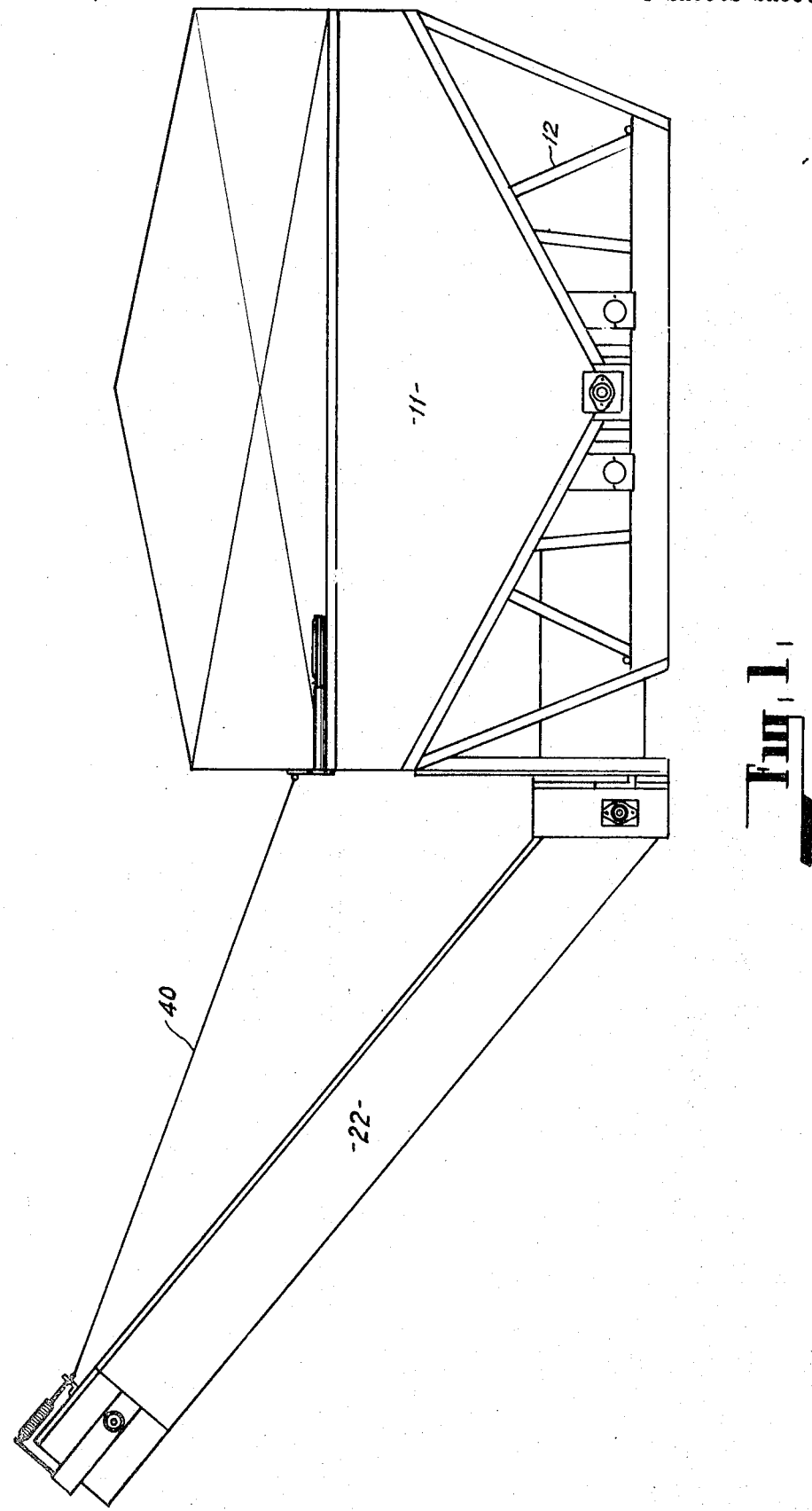
FIG. 1 is an end elevation of the embodiment.
Figure 2:
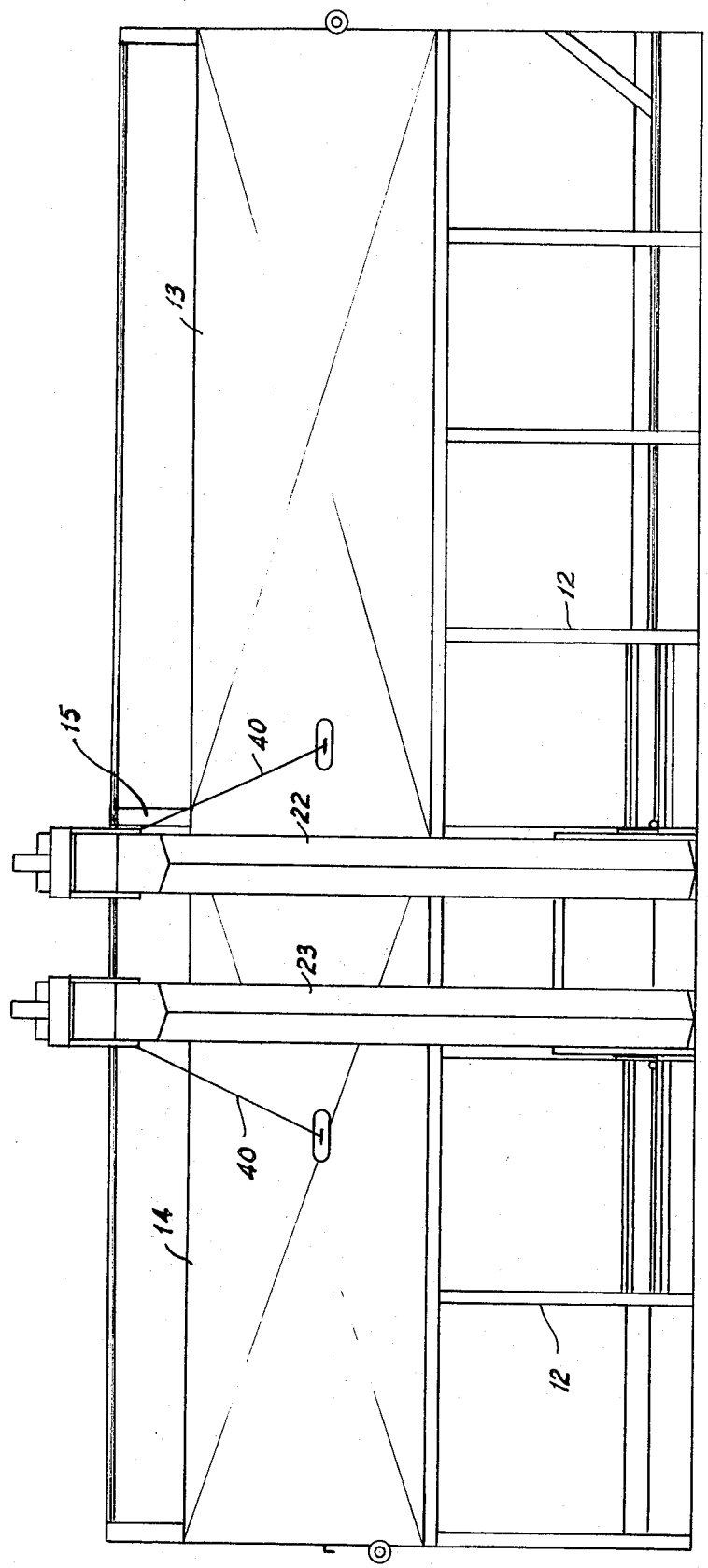
FIG. 2 is a side elevation of the embodiment.

In the embodiment shown in the drawings, the bin 11 which is preferably formed of sheet metal is substantially rectangular in plan and supported on a suitable angle iron framework 12 mounted on the chassis of a motor truck or other suitable vehicle. The bin 11 is divided into two compartments 13 and 14, one being preferably larger than the other, by means of a substantially vertical transverse partition member 15, the lower portion of which is bifurcated to slope downwardly and inwardly to the compartments 13 and 14. The lower portion of each of the opposite side walls of the bin 11 also slope downwardly and inwardly to form a central longitudinal channel 16 and 17 at the bottom of each of the compartments 13 and 14 so that when the compartments are viewed in end elevation the lower portion is substantially V-shaped in cross-section. The channels 16 and 17 at the bottom of the compartments 13 and 14 are suitably dimensioned so as to accommodate material conveying augers 18 and 19 which feed the particulate material from the compartments towards the partition 15. The augers 18 and 19 are each adapted to feed the material through an opening in the partition 15 to one of a pair of horizontal transverse endless scraper conveyors 20 and 21 situated between the arms of the bifurcated portion of the partition member 15. Each of the scraper conveyors 20 and 21 co-operates with a suitable elevator 22 and 23 which also are preferably in the form of an endless scraper conveyor, hingedly mounted on the side of the bin for rotation about a substantially vertical axis.

The drive for the augers 18 and 19 and the scraper conveyors 20 and 21 may be derived from the power take-off unit of the motor vehicle on which the bin is mounted, or alternatively by separate motor means mounted on the bin. Preferably the drive for the augers and scraper conveyors is derived by means of a drive rod 24 mounted below the bin and adjacent and parallel to the auger 18 of the forward compartment 13. Each auger, its associated scraper conveyor and its associated elevator are preferably driven from the drive rod 24 through a suitable clutch mechanism such as dog clutches 25 and 26, these clutches being engaged and disengaged by means of a system of levers 27 pivotally connected together. The augers 18 and 19 are driven from the drive rod 24 by a suitable chain and sprocket drive, 28, one of the sprockets of the drive being mounted on the end of the auger shaft. The drive for the scraper chains is also preferably derived from rotation of the auger shaft. The drive for the elevators 22 and 23 is derived from a belt and pulley arrangement 29, one of the pulleys being mounted on the end of the auger shaft. Drive is preferably transmitted to the elevators by use of a spring loaded jockey pulley 30.

To ensure that the particulate material in each compartment flows down to the augers associated with that compartment especially when the material is superphosphate, the sloping portions of the walls of the bin are each provided with a bank of tickler vibrator wires 31, which are secured at their upper ends and which lie upon the sloping walls and are loosely secured thereto at some point intermediate their ends by means of U clips 41, the tickler vibrator wires extending down into the flights of the augers 18 and 19 such that rotation of the augers cause the vibrator wires 31 to move back and forth resulting in the material on the sloping walls falling into the auger channels.

To prevent the bearings of the shafts of the augers and the other shafts associated with the conveyors from becoming clogged when superphosphate is in the bin, each shaft is preferably mounted as follows: The shaft protrudes through the wall of the bin through a hole of slightly larger diameter than the diameter of the shaft. The bearing 32 which is preferably of the self aligning type is mounted preferably on the base portion of a horizontally mounted U-shaped bracket 33, the free ends of the arms of the bracket being mounted adjacent the hole through which the shaft protrudes. This ensures that the bearing 32 is sufficiently spaced from the bin so as to remove any possibility of superphosphate in the compartments clogging the bearing.

When superphosphate is being conveyed by the scraper conveyor, the sprocket wheels of the scraper conveyor tend to get a build up of superphosphate on the teeth thereof, resulting in the tension in the scraper chain increasing, which may result in breakages and undue wear. To avoid this problem the sprocket wheels of the scraper chain conveyor have their associated shafts 34 protruding through a substantially horizontal slot 35, the shaft 34 being connected by suitable cable means 36 to a spring 37 which exerts a pull on the shaft 34. As tension in the scraper chain builds up, the shaft moves against the action of the spring 37 to allow the tension in the chain to remain substantially constant.

Figure 3:
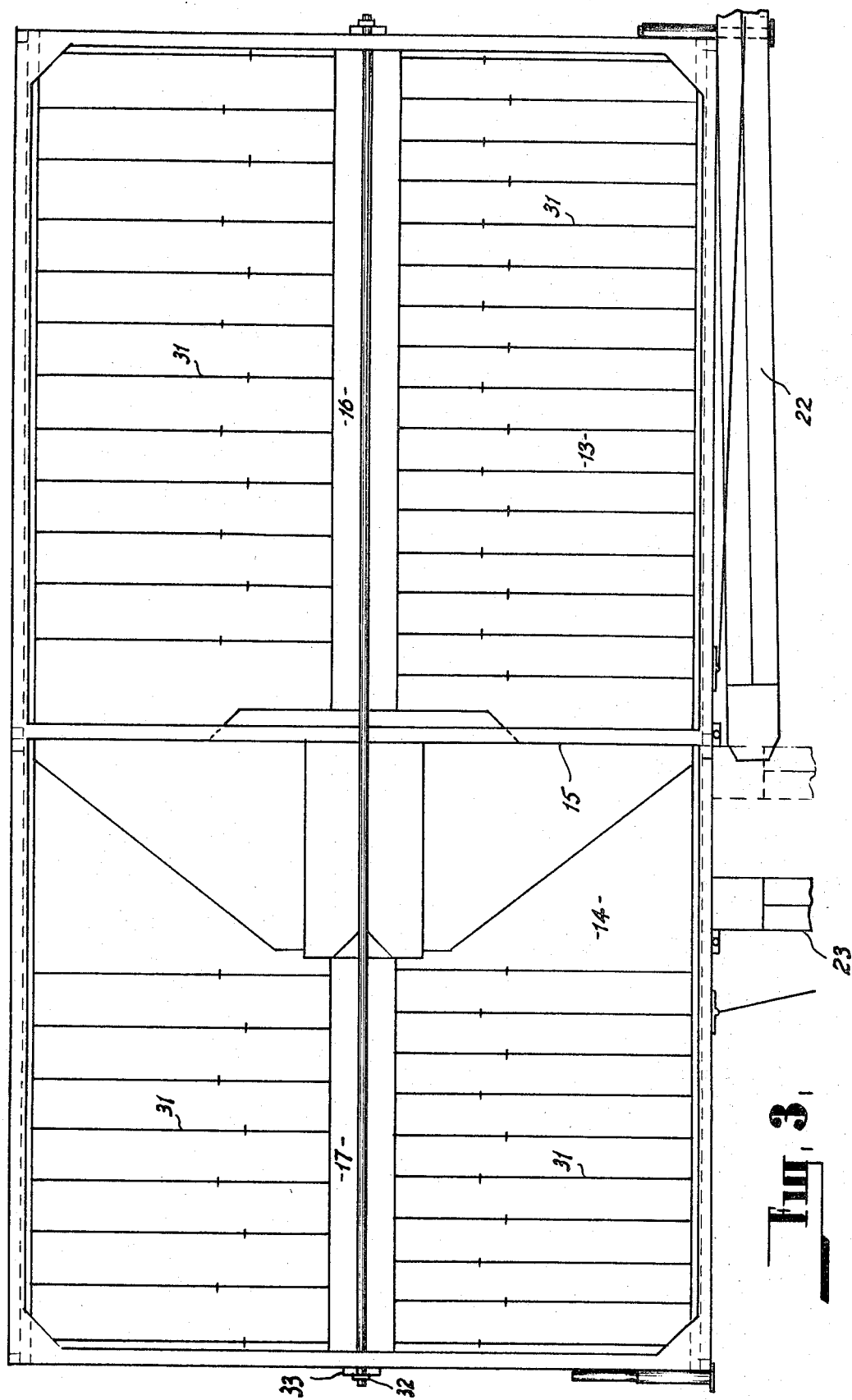
FIG. 3 is a plan view of the embodiment.
Figure 4:
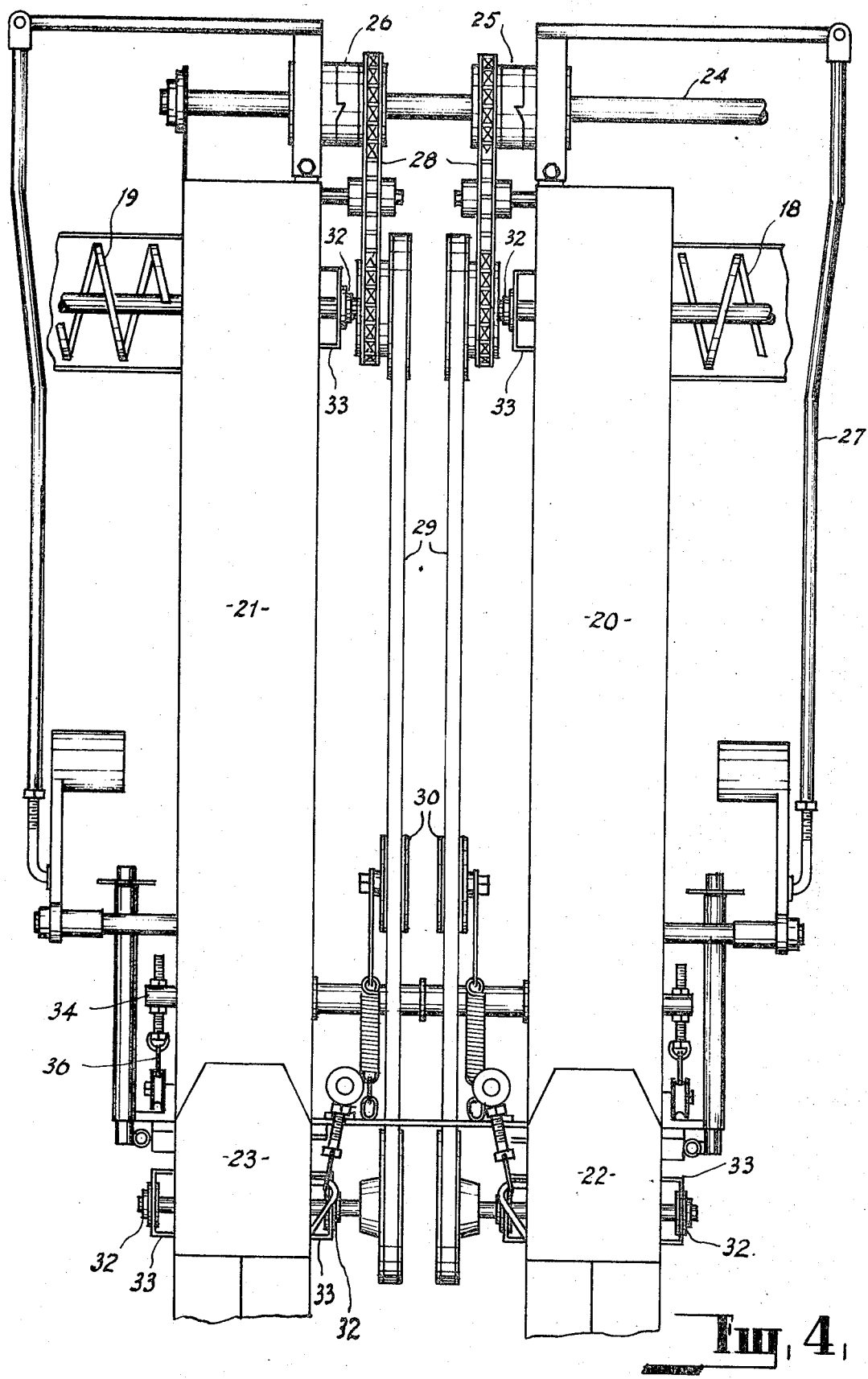
FIG. 4 is a plan view of the drive arrangements for the conveyors.
Figure 5:
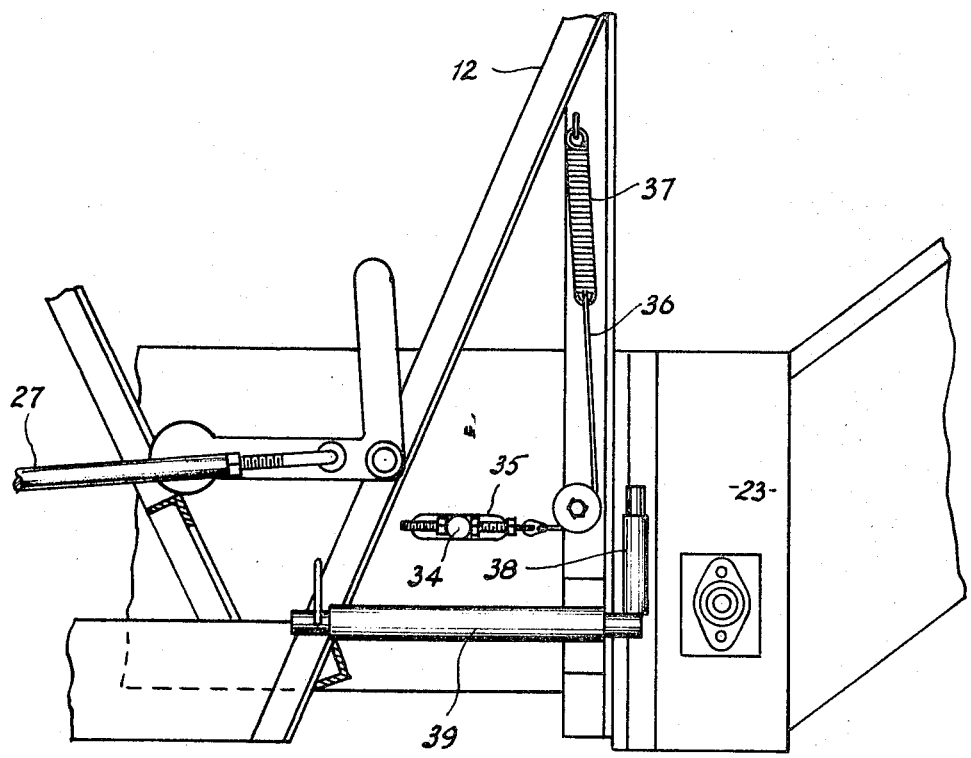
FIG. 5 is an elevation of portion of the drive arrangements showing the tensioning system for the conveyor.

The elevators 22 and 23 are each pivoted about a substantially vertical pin 38 for movement in a horizontal plane so that when not in use the elevators may be swung to a position alongside the side of the bin as shown in FIG. 3. Preferably the vertical pin 38 is capable of limited movement in a vertical plane and is mounted at one end of an arm 39 the other end of which is pivoted about a horizontal pivot pin. In the working position the elevators are supported against movement in the vertical plane by means of guy wires or ropes 40.

The discharge outlets of the elevators 22 and 23 are each provided with a flexible, telescopic discharge trunk or "elephant trunk" (not shown) which may be detachably secured to the elevator outlet. Such trunks are of especial advantage when discharging grain and/or superphosphate directly into seeder combines.

To enable the bin to be used for gravity discharge when desired, the central longitudinal channels 16 and 17 may each be provided with either hinged doors or sliding flaps (not shown) in the bottom of the channels. Such doors or flaps are also useful for ease of cleaning the compartments. The casings of the scraper conveyors 20 and 21 may also be provided with doors for cleaning purposes.

We claim:

1. A bin for the handling of particulate material, comprising at least one partition for dividing the bin into a plurality of compartments, said partition being formed to define an opening therein, a plurality of first conveyors each disposed within the bottom of a compartment and extending into said opening, a plurality of second conveyors each communicating with one of said first conveyors and being disposed substantially perpendicularly thereto for feeding particulate material from each compartment for discharge to one side of the bin.

2. A bin according to claim 1, wherein the lower portion of said partition is bifurcated and said second conveyors are disposed between the bifurcated portions of the partition.

3. A bin according to claim 1, further comprising a plurality of elevators hingedly mounted from said one side of the bin, each of said second conveyors being adapted to feed particulate material from the bin to a corresponding one of the elevators.

4. A bin according to claim 1, wherein said first conveyors are augers, and said second conveyors are scraper conveyors.

5. A bin according to claim 4, further comprising a drive rod adapted to be connected to a power source, for driving said augers and scraper conveyors.

6. A bin according to claim 4, wherein the augers and scraper conveyors are respectively mounted from shafts each journaled in the bottom of a U-shaped bracket, said shafts protruding through holes defined by the walls of the compartments, and the free ends of the U-shaped brackets each being mounted adjacent to the hole through which a corresponding shaft passes.

7. A bin according to claim 4, wherein the sidewalls of the compartments are sloping inwardly and further comprising a plurality of tickler vibrator wires extending along the sloping sidewall portions into the flights of the augers, said tickler vibrator wires being connected from the augers whereby the rotation of the augers causes vibration of the wires.

8. A bin according to claim 4, wherein each scraper conveyor comprises a casing defining a slot therein, an endless chain, a pair of sprocket wheels mounted for rotation within the casing, the endless chain passing around said pair of sprocket wheels, the shaft associated with one of the sprocket wheels passing through a horizontally disposed slot in the wall of the casing and being resiliently biased against the force of the tension in the endless chain to maintain a substantially constant tension therein.

9. A bin according to claim 4, wherein the sidewalls of the compartments are sloping inwardly forming central channels in each compartment, said channels each being provided with a discharge door formed in the bottom thereof to permit gravity discharge of particulate material in said compartments.

References Cited

UNITED STATES PATENTS

| 2,753,089 | 7/1956 | Phillips | 222—413 XR |
| 2,960,320 | 11/1960 | Heider | 214—522 XR |
| 3,282,456 | 11/1966 | Hawes | 214—519 |

ROBERT G. SHERIDAN, Primary Examiner

U.S. Cl. X.R.

198—104; 214—522; 222—135